US006243759B1

(12) United States Patent
Boden et al.

(10) Patent No.: US 6,243,759 B1
(45) Date of Patent: Jun. 5, 2001

(54) METHOD AND SYSTEM FOR CONFIGURING DYNAMIC INTERFACES

(75) Inventors: Edward Barnes Boden; Paul Albert Gebler, Jr.; Franklin Alfred Gruber, all of Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/075,043

(22) Filed: May 8, 1998

(51) Int. Cl.[7] .............................. G06F 13/00; G06F 17/00
(52) U.S. Cl. ........................ 709/238; 709/227; 709/919; 709/217; 709/218; 709/203
(58) Field of Search .................................. 709/200, 201, 709/203, 217, 219, 220, 238, 221, 227, 223, 224, 225

(56) References Cited

U.S. PATENT DOCUMENTS

| | | | |
|---|---|---|---|
| 5,678,004 | * 10/1997 | Thaweethai | 713/201 |
| 5,737,333 | * 4/1998 | Civanlar et al. | 370/352 |
| 5,802,316 | * 9/1998 | Ito et al. | 709/249 |
| 5,812,819 | * 9/1998 | Rodwin et al. | 703/23 |
| 5,974,453 | * 10/1999 | Anderson et al. | 709/220 |
| 5,978,568 | * 11/1999 | Abraham et al. | 709/224 |
| 5,999,965 | * 12/1999 | Kelley | 709/202 |
| 6,009,469 | * 12/1999 | Mattaway et al. | 709/227 |
| 6,014,660 | * 1/2000 | Lim et al. | 707/3 |
| 6,014,687 | * 1/2000 | Watanabe et al. | 709/204 |

OTHER PUBLICATIONS

Network Working Group, *Routing Information Protocol* Request for Comments (RFC) 1058, Jun. 1988, pp. 1–33.
Network Working Group, *RIP Version 2 Carrying Additional Information*, Request for Comments (RFC) 1723, Nov. 1994, pp. 1–9.
Network Working Group, *The PPP Internet Protocol Control Protocol (IPCP)*, Request for Comments (RFC) 1172, May 1992, 12 pages.
Network Working Group, *The MD5 Message–Digest Algorithm*, RFC 1321, Apr. 1992, 21 pages.
Network Working Group, *PPP in HDLC–like Framing*, RFC 1549, Jul. 1994, 25 pages.
Network Working Group, *PPP Challenge Handshake Authentication Protocol (CHAP)*, RFC 1334, Aug. 1996, 12 pages.
Network Working Group, *The Point–to–Point Protocol (PPP)*, RFC 1661, Jul. 1994, 52 pages.

* cited by examiner

*Primary Examiner*—Moustafa M. Meky
*Assistant Examiner*—Abdullahi E. Salad
(74) *Attorney, Agent, or Firm*—Shelly M Beckstrand

(57) ABSTRACT

Dynamic interfaces such as PPP interfaces are configured by (1) saving routing configuration information using symbolic names; (2) determining when a symbolically named interface becomes active; (3) resolving the symbolic name to an operational IP address for routing and RIP traffic; and thereafter (4) communicating dynamic protocol packets over the dynamic interface.

6 Claims, 4 Drawing Sheets

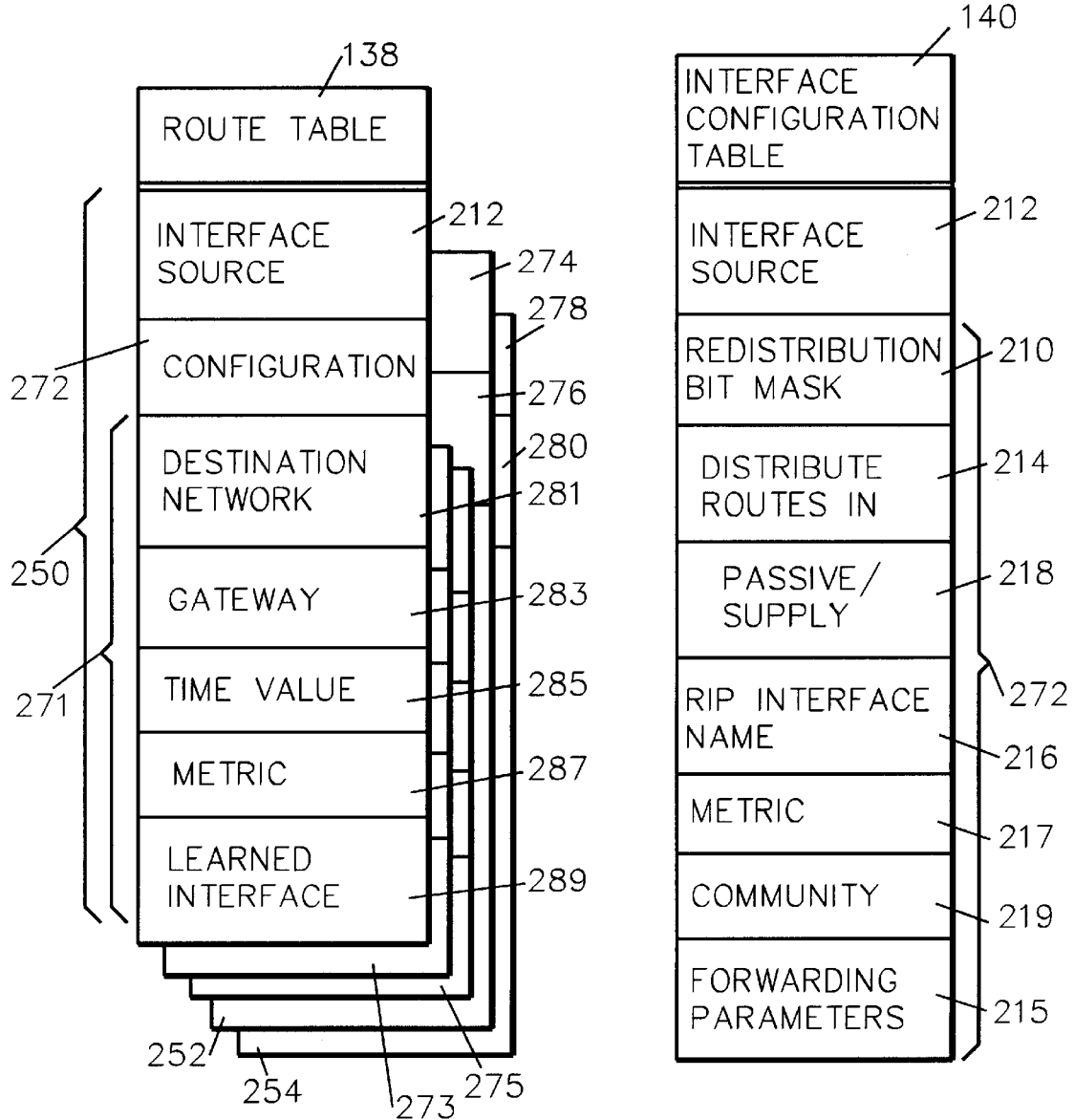

METHOD AND SYSTEM FOR CONFIGURING DYNAMIC INTERFACES

BACKGROUND OF THE INVENTION

1. Technical Field of the Invention

This invention relates to communications protocols, and more particularly to a system and method for configuring dynamic interfaces between active and inactive states.

2. Background Art

The Routing Information Protocol (RIP) is a defacto standard for the exchange of routing information among gateways and hosts. Two such standards are the RIP-1 and RIP-2. RIP-1 is described in Network Working Group, *Routing Information Protocol,* Request for Comments (RFC) 1058, June 1988, pages 1–33. RIP-2 is described in Network Working Group, *RIP Version 2 Carrying Additional Information,* RFC 1723, November 94, pages 1–9.

The Internet is organized into a number of networks connected by gateways. The networks may be either point-to-point links or more complex networks such as Ethernet or the token ring. Hosts and gateways are presented with IP datagrams addressed to some host. Routing is the method by which the host or gateway decides where to send the datagram. It may be able to send the datagram directly to the destination, if that destination is on one of the networks that are directly connected to the host or gateway. When the destination is not directly connected, and thus not directly reachable, the host or gateway attempts to send the datagram to a gateway that is nearer the destination. The goal of a routing protocol is to supply the information that is needed to do routing. (See Network Working Group, *Routing Information Protocol,* Request for Comments (RFC) 1058, June 1988, pp. 2–3.)

Routing is the task of finding a path from a sender to a desired destination. This may be viewed as a matter of finding gateways between networks. Internet protocol (IP) routing deals with communicating messages from a sender on one such network to a destination on a different one. In that case, the message must pass through gateways connecting the networks. If the networks are not adjacent, the message may pass through several intervening networks and the gateways connecting them. A "network" may cover a single broadcast network (e.g., an Ethernet), a point to point line, or a packet switch network, such as asynchronous transfer mode (ATM). A network is treated as a single entity by IP. Either no routing is necessary (as with a point to point line), or routing is done in a manner transparent to IP, allowing IP to treat the entire network as a single full-connected system. IP is the network layer of the TCP/IP protocol stack.

One of several approaches for finding routes between networks is based on distance vector algorithms. In this approach, each entity (gateway or host) that participates in the routing protocol is assumed to keep in a routing database information about all of the destinations within the system. Each entry in this routing database includes the next gateway to which datagrams destined for the entity should be sent and a "metric" measuring the total distance to the entity. Distance is a generalized concept which may also cover the time delay in getting messages to the entity or the dollar cost of sending messages to it. Routing information is exchanged only among entities that are adjacent; that is, entities that share a common network.

A typical routing database implementation includes the following information about each destination:

address: in IP implementations, this will be the IP address of the host or network.

gateway: the first gateway along the route to the destination.

interface: the physical network which must be used to reach the first gateway.

metric: a number, indicating the distance to the destination.

timer: the amount of time since the entry was last updated.

This database is initialized with a description of the entities that are directly connected to the system. It is updated according to information received in messages from neighboring gateways. Each entity participating in the routing scheme sends update messages that describe the routing database as it currently exists in that entity. Optimal routes for the entire system may be maintained using only information obtained from neighboring entities.

Distance vector algorithms are based on a table giving the best route to every destination in the system. A metric is used to define "best". In simple networks it is common to use a metric that simply counts how many gateways a message must go through (sometimes referred to as the number of hops.) In more complex networks, a metric may be chosen to represent the total amount of delay the message suffers, the cost of sending it, or some other quantity which may be minimized. In each approach, the metric represents a sum of costs for individual hops.

A host or gateway G keeps, for each destination in the system a current estimate of the metric for that destination and the identity of the neighboring gateway on whose data that metric is based. If the destination is on a network that is directly connect to gateway G, then G uses an entry that shows the cost of using the network, and the fact that no gateway is needed to get to the destination. This combination of destination, metric, and gateway is typically referred to as a route to the destination with that metric, using that gateway.

Periodically, each gateway or host sends a routing update to every neighbor. The update is a set of messages that contain all of the information from the routing table. Two such update messages are the RIP-1 and the RIP-2 messages. (The format of a RIP-1 message is shown in Routing Information Protocol, Request for Comments (RFC) 1058, and that of a RIP-2 message in RIP Version 2 Carrying Additional Information, RFC 1723.) The routing table contains an entry for the route with the best metric for each active destination, with the distance shown to that destination. When a routing update arrives from a neighbor G', this gateway G adds the cost associated with the network that is shared with G' (the network over which the update arrived), and the result compared with the current entry in this gateway's routing table for the destination. If the metric is less, the table entry is updated to the new metric and gateway. Even if the metric is more, if it came from the same gateway, then the table entry is updated to the new, larger metric.

An improved method and system for exchanging routing information is described in co-pending patent application, Ser. No. 09/075,044 filed May 8, 1998, now U.S. Pat. No. 6,167,444, the teachings of which are incorporated herein by reference.

There are two basic schemes used to manage IP address assignments for point to point (PPP) links. These are (1) fixed assignment and (2) dynamic assignment. Fixed assignment is generally used for dedicated links while dynamic assignment is used for dial-up. Historically, dynamic address assignment was used for single remote workstations which don't require the need to run a dynamic routing protocol. An address depletion problem exists today which has resulted in the need to use dynamic address assignment for entire remote local area networks (LANs). As a result, it has been necessary to run dynamic routing protocols over interfaces that don't have single fixed IP addresses.

While running the Routing Information Protocol (RIP), dynamic interfaces can change their state from active to inactive and the reverse. When such an interface becomes active from an inactive state, it may or may not have the same IP address associated with it. If needed, it would be difficult to configure such a dynamic interface because there exists no constant value that can be used to identify the interface.

Consequently, it is an object of the invention to provide a constant value for identifying a dynamic interface.

It is a further object of the invention to provide an improved system and method for configuring a dynamic interface.

It is a further object of the invention to provide constant values identifying the configurations of dynamic interfaces.

It is a further object of the invention to provide the processing advantages of running a dynamic routing protocol over an interface with a changing IP address.

SUMMARY OF THE INVENTION

In accordance with the method of the invention, configuring dynamic interfaces includes the steps of (1) saving routing configuration information using symbolic names; (2) determining when a symbolically named interface becomes active; (3) resolving the symbolic name to an operational IP address for routing and dynamic routing protocol traffic; and communicating dynamic protocol packets over said dynamic interface.

BRIEF DESCRIPTION OF THE DRAWING

FIG. 2 is a representation of the interface configuration table of FIG. 1 in accordance with a preferred embodiment of the invention.

FIG. 3 is a representation of the route table of FIG. 1 in accordance with a preferred embodiment of the invention.

BEST MODE FOR CARRYING OUT THE INVENTION

This invention provides a method and system for establishing routing paths among offices within a system including both wide area networks (WANs) and local area networks (LANs). More particularly, it relates to the configuration, activation and deletion of point-to-point interfaces. Through the use of symbolic names, the RIP protocol is run over dynamic point-to-point interfaces. As interfaces are activated and deactivated, addresses are negotiated so they can't be hard coded. By configuring to symbolic names, when an IP address is negotiated, the configuration can be applied and RIP executed.

Figure 1:
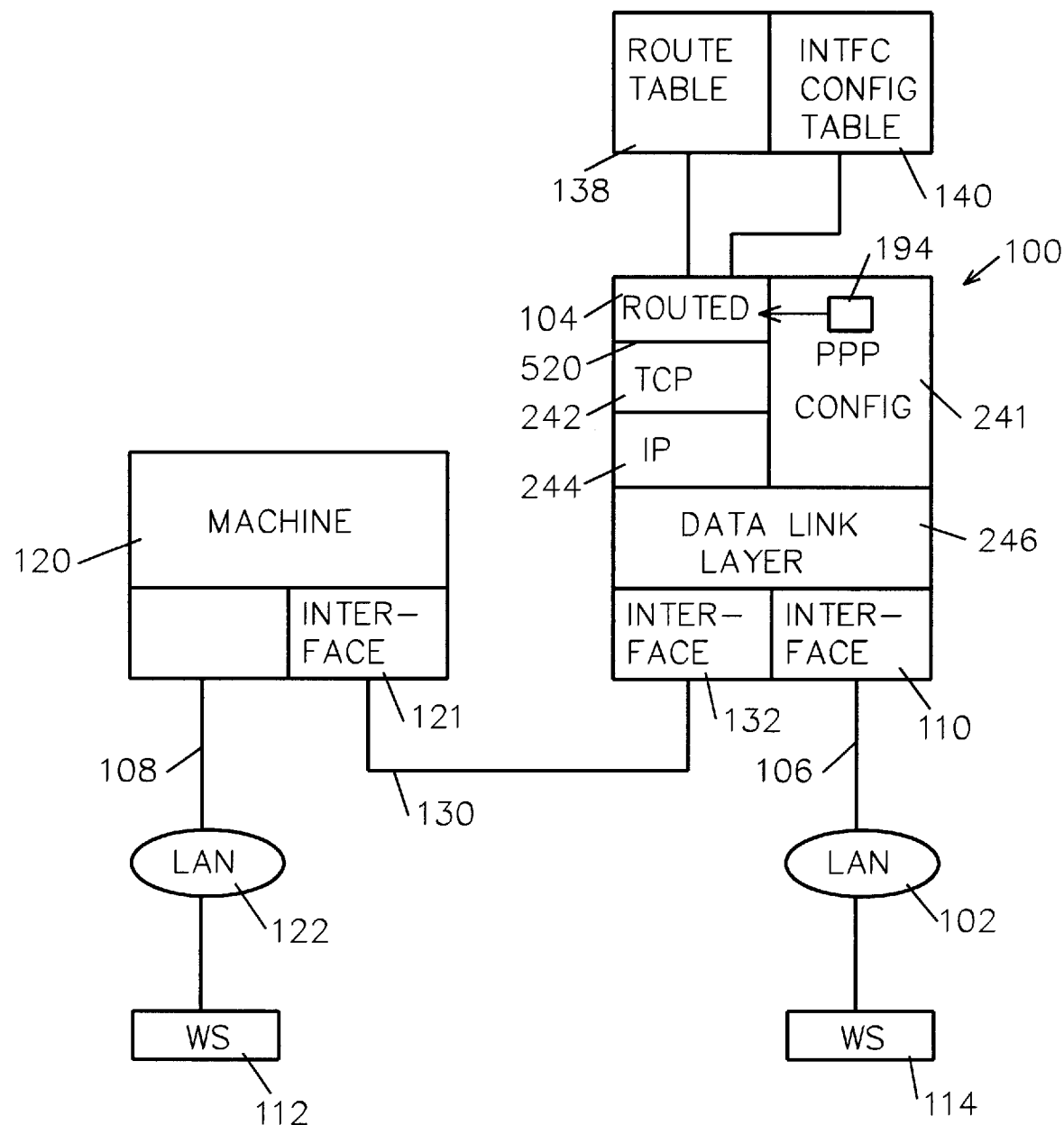
FIG. 1 is a system diagram illustrating the system of the invention.

Referring to FIG. 1, machines 100 and 120 represent host systems functioning as routers, and therefore including a router application, such as RouteD 104. RouteD is an application which implements the RIP-1 and RIP-2 protocols. Machine 100 may be, for example, an IBM AS/400 system. RouteD 104 maintains tables of routing and configuration information, illustrated here as configuration table 140 and route table 138. Message 194 contains activation notification information from PPP configuration code 241 to RouteD code 104.

Dynamic connection 130 is an implementation of a wide area network (WAN). Examples of wide are networks include packet switch networks, such as ATM and X.25, and point to point networks, such as serial link IP (SLIP), high level data link control (HDLC) and point-to-point protocol (PPP). Local area networks 102, 122 may implement, for example, a token ring or Ethernet protocol.

In accordance with a preferred embodiment of the invention, each machine 100, 120 includes a router, such as RouteD 104, running RIP. Machine 100 has an active connection through interface 110 over line 106 to LAN 102, and machine 120 has an active connection 108 to LAN 122. Machines 100 is connected through interface 132 to machine 120 over a wide area network PPP connection 130. Since both machines 100 and 120 are running RIP, machine 100 has routes associated with, for example, workstation 114 on LAN 102, and machine 120 has routes associated with, for example, workstation 112 on LAN 122.

RIP is a distance vector protocol implemented by hosts and gateways, such as gateway machines 110, 120 to exchange information for computing routes through an IP-based network. (The terms, "host", "router" and "gateway" may be used interchangeably.) RIP is used to convey information about routes to destinations, which may be individual hosts, networks, or a special destination used to convey a default route.

Any host 100 that uses RIP is assumed to have interfaces 110 to one or more networks, and these are referred to as its "directly-connected networks." Such hosts 100 have a routing table 138 with one entry for every destination 102, 112, 114, 122 that is reachable through the system described by RIP.

Referring to FIG. 2, in a preferred embodiment, an interface configuration table 140 is provided with an entry for each interface 110, 132 including the interface name 216 (which is one of (a) a logical interface name for a dynamic interface, or (b) an IP address for a non-dynamic interface), an interface type or source field 212 set to LAN or WAN, a redistribution bit mask 210 and a "distribute routes in" (DRI) field 214.

Metric 217 specifies the metric that is to be added to routes received through the specified interface 110, 132.

Community 219 specifies the community name used by this interface, say 110, for authentication purposes. If a community name is not specified, then authentication is not indicated for this interface 110.

Forwarding parameters 215 include zero to N parameters including block, forward, forward.cond and noforward.

RIP interface name 216 specifies the RIP interface 110, 132 on host 100 this statement, or entry in table 140, pertains to. It may include a network, specified as an IP address and a mask or an IP address and a bit_number, or as an interface name, which is a logical interface name used to identify a dynamic interface which will have an IP address assigned dynamically at the time connection 130 becomes active; or as a host name; or as *, which is used to refer to all interfaces 110, 132 on host 100 to set default values that can be overridden by providing a RIP interface statement.

As is further described in patent application Ser. No. 09/075,044, filed May 8, 1988, now U.S. Pat. No. 6,167,444, distribute routes in (DRI) 214 controls how routes received from this RIP interface 110 (network) are to be redistributed by router 100 to wide area networks such as WAN 130. This parameter 214 does not affect redistribution of routes to local area networks (LANs) 102.

A passive/supply 218 value set to passive indicates that no RIP traffic is received and no RIP traffic is generated on the specified interface 110, 132. A passive/supply 218 value set to supply indicates which type of routing information to supply to neighboring routers via RIP. If supply 218 is set to RIP1, both RIP version 1 and RIP version 2 messages will be received on the specified interface and RIP version 1 messages will be sent. If supply 218 is set to RIP2, both RIP version 1 and RIP version 2 messages will be received on the specified interface and RIP version 2 messages will be multicast on the specified interface. If supply 218 is set to off, both version 1 and version 2 RIP messages will be received, but no RIP packets will be sent.

A RIP_INTERFACE statement is used to specify all routing related options that are configured on a per-interface basis. Multiple interface options can be specified on a single entry in configuration file 140, provided that only one of those options that require a destination address appears on a given statement. For example, a statement could use the forward and metric options on a single line, but the forward and noforward options could not appear on the same line. Preferably, multiple lines are used to specify multiple options for a given interface.

The RouteD routing protocol task 104 implemented in router 100, for example, needs to be notified of configuration changes to interface configuration table 140 in a dynamic manner. Configuration table 140 changes which must be accommodated include (1) the activation of a dynamic interface 132, (2) the deletion of a dynamic interface 132, and (3) a change to configuration requiring a RouteD internal configuration update.

Referring to FIG. 3, route table 138 includes for each active interface 250, 252, 254 interface source fields 212, 274, 278, associated configuration fields 272, 276 and 280 and one or more route entries 271, 273, 275. Interface source 212 corresponds to the local IP address 170 from message 194. Configuration source fields 272, 276 and 280 include corresponding fields 272 from interface configuration table 140. Each route entry 271, 273, 275 includes destination network 281, gateway 283, time value 285, metric 287, and learned interface 289. Destination network 281 is derived by ANDing the subnet mask against either the local or remote IP address to generate a destination network IP address. Gateway 283 is the remote IP address of the next hop, and is obtained from remote IP address field 180 of message 194. Learned interface 289 is the IP address of the interface from which this route entry 271 was learned. Metric 287 is the current value of the metric associated with this route 271, whereas the metric 217 in configuration 272 is the initialization value which is subject to change by RIP traffic to derive the current value metric 271.

Figure 4:
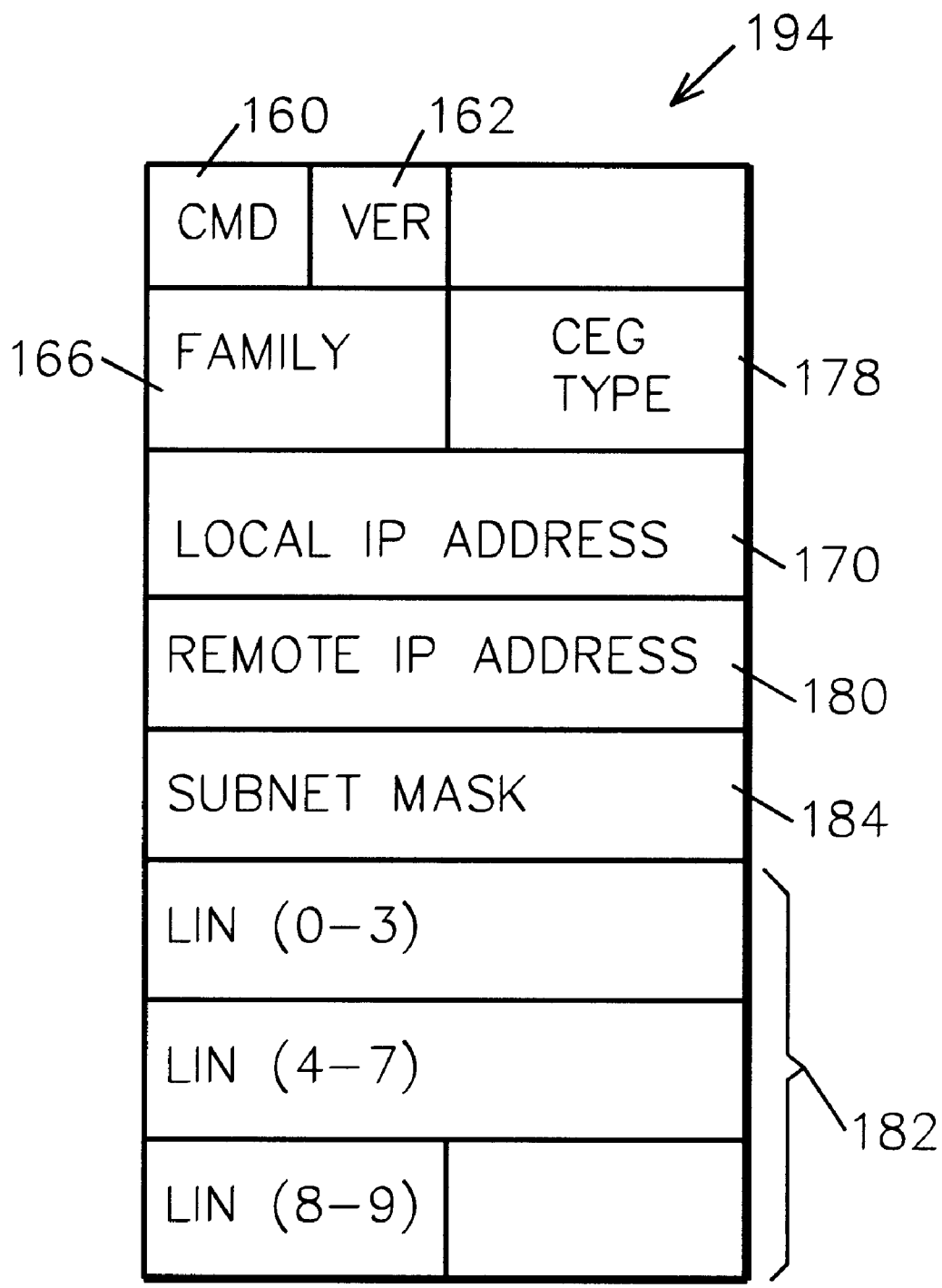
FIG. 4 is a representation of the message format for activation of a previously deleted point-to-point interface.

Referring to FIG. 4, the message format for dynamic activation and deletion from PPP configuration 241 to RouteD 104, or from any other dynamic interface implementation, is set forth.

Command field 160 identifies whether a point-to-point connection has been activated (0xBF), deactivated (0xA0), or that a configuration change has been made (0xBE) and that the RouteD task needs to perform a refresh of tables 138, 140.

Version field 162 is set to 0x02, indicating that this message 194 pertains to RIP version 2. Address family identifier field 166 is set to 0x01C7. Subnet mask field 184 represents the subnet mask address to be associated to logical interface name (LIN) 182.

Configuration type field 178 identifies the address configuration of dynamic link 130. The possible values are (1) 0x01 existing local IP address, (2) 0x02 existing local network address, or (3) 0x03 unique host address.

IP address fields 170 and 180 represent the IP address to be associated to the logical name 182. Logical interface name 182 contains a character string representing a logical interface name. A local IP address 170 is the IP address of local end 132, and remote address 180 is the IP address of remote end 121, of dynamic connection 130.

Subnet masks are used to determine network addresses as follows. The IP address and subnet mask are ANDed to determine the network. For example, if the IP address is 10.5.6.7 (hex 0A 05 06 07) and the subnet mask 255.255.255.0 (hex FF FF FF 00), these are ANDed to give 10.5.6.0 as the subnet address. Valid address on this subnet are 10.5.6.0 through 10.5.6.253.

Referring to FIGS. 1–4, in operation, assume RouteD 104 at gateway 100 is running on LAN 102 with no dynamic interface 132 active. (By "active" is meant all configurations have been read and the interface is in operation.) Thereafter, a dial-up call comes in over interface 132 and is handled by configuration code 241. This dial up call comes in with a user selected logical interface name 182. Configuration code 241 negotiates with calling machine 120 for two addresses 170, 180, one each for remote office 112 and for interface 130 and these are provided to RouteD 104 along with LIN 182 by way of a message 194 that notifies RouteD 104 that interface 132 has become active and that the negotiated addresses are to be resolved. In accordance with this preferred embodiment, message 194 is directed to RouteD using loop back such that the message appears on the interface between TCP 242 and RouteD 104 at port 520—which in this embodiment is the only place RouteD is listening.

In response to the message 194, RouteD 104 searches configuration table 140 for the logical name 216 matching the logical interface name 182 provided in message 194. Upon finding a match on logical name 216 an entry into routing table 138 is made. That entry includes configuration information 272 from interface configuration table 140 and information from message 194.

The result is that RouteD 104 has an IP address which it can advertise to interfaces 110, 132 showing the network address (in decimal dotted notation) and a logical or symbolic interface name 182 from message 194.

A symbolically configured interface name may have any number of simultaneous activations, and all would show up in routing table 138 with separate source interfaces 212, 274, 278 and separate routes 271, 273, 275.

When dynamic interface 130 goes down, advertisement of this network 130 will no longer be transmitted out inasmuch as a router 100 connection with remote office 112 is gone.

Figure 5:
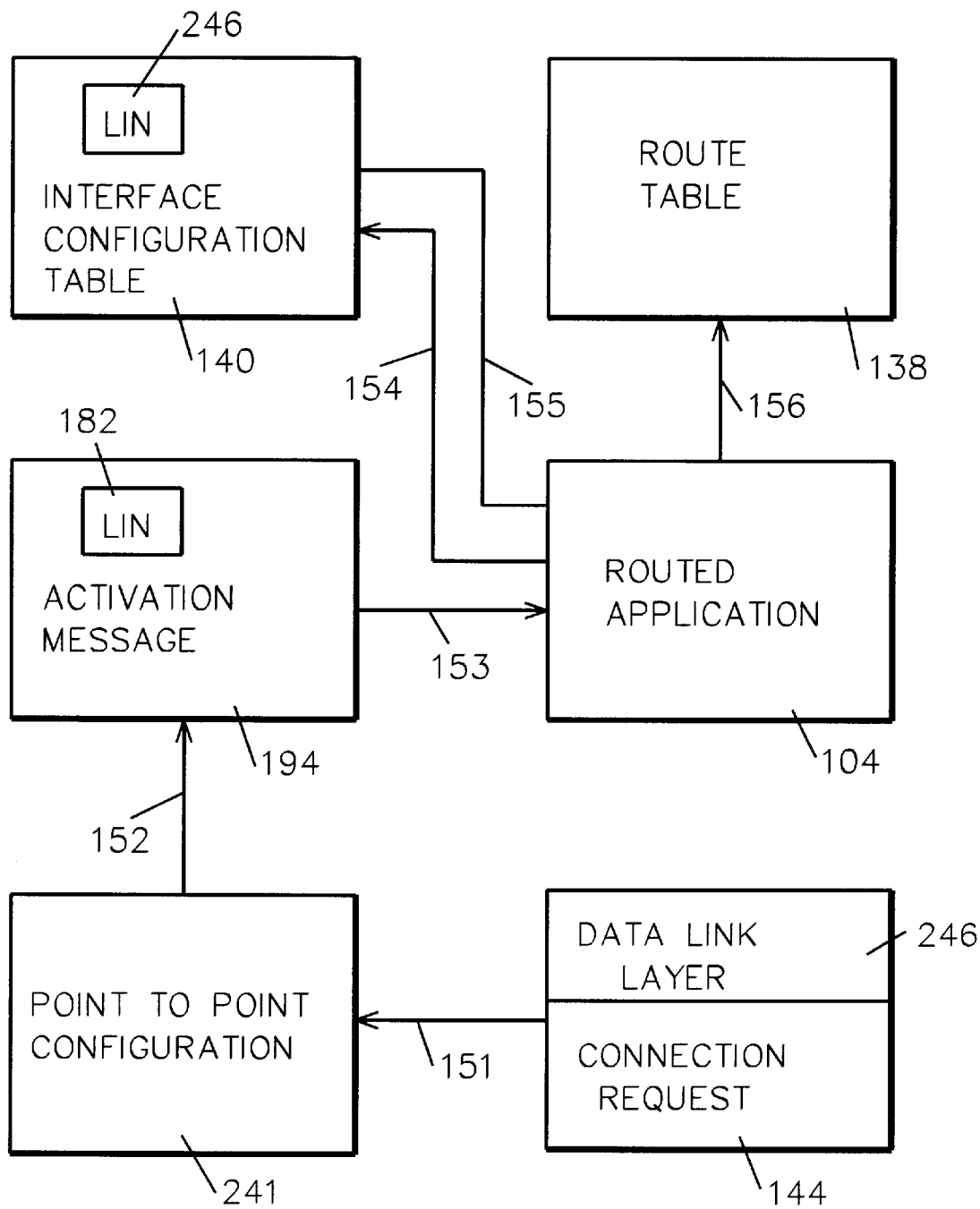
FIG. 5 is a representation of the interrelationship of key logical elements in the machine of the invention.

Referring to FIG. 5, the key inter-relationships among the elements of the invention as set forth in FIGS. 1–4, will be described. In the preferred embodiment, RouteD 104 is the key active (software) element. As is represented by line 151, PPP configuration module 241 receives a connection request 144 from data link layer 246, which includes a user-selected logical name. Responsive to that connection request 144, PPP configuration code 241, during making of the connection to bring up a dynamic link, associates the logical name with an IP address. As is represented by line 152, PPP configuration 241 generates an activation message, or interface start message, 194 which includes the logical name 182 from the connection request, and the local IP address 170 and remote IP address 180 which PPP configuration code 241 associates with the logical name 182.

As is represented by line 153, RouteD application code 104 receives start message 194, including the logical interface name 182 for the starting dynamic interface. As is represented by line 154, logical interface name 182 is then used to search the interface configuration table 140 for a matching configured interface. That is, comparison for equality is made between LIN 182 of activation message 194 and LIN 216 of interface configuration table 140. If a match is found (the two fields are equal), information is combined from interface configuration table 140 and the interface start message 194 to create a route table 138 route entry 271.

By way of further explanation of a specific preferred embodiment of the invention, focus on PPP connection 130 between machines 100 and 120. If one machine attempts to connect to the other, the following sequence of events will occur.

1. A physical connection is made.
2. PPP configuration parameters 272 are negotiated. The protocols for negotiating these parameters are set forth in Network Working Group, Request for Comments (RFC) 1661, "The Point-to-Point Protocol (PPP)", July 1994, and RFC 1662, "PPP in HDLC-like Framing", July 1994.
3. If authentication is required, it is performed. Authentication in this context is described in RFC 1994 "PPP Challenge Handshake Authentication Protocol (CHAP)", August 1996 and RFC 1321 "The MD5 Message-Digest Algorithm", April 1992.
4. TCP/IP information is negotiated. This information includes the local and remote IP addresses. The protocol for this negotiation is described in RFC 1332, "The PPP Internet Protocol Control Protocol (IPCP)", May 1992.

This sequence of events is necessary to negotiate an IP address and network information, for such is not a known value. A standard router will simply exchange routing information over this new connection with no preconceived configuration for that interface. This is the problem that the present invention resolves. In accordance with the invention, the PPP interface 130 characterized by the local and remote IP addresses may be associated with a name 182 (or logical name, or symbolic name—they all refer to the same thing) that, in turn, is used to associate a predefined configuration with the interface.

In accordance with the invention, when router 104 starts, it will read a list of active interfaces 212, 274, 278 and associated configurations 272, 276, 280, and route entries 271, 273, 275, respectively, and maintain a table 138 of these configurations in code. RouteD 104 also maintains a list 140 of just configurations based upon the symbolic name. As a PPP interface 132 becomes active and after TCP/IP information has been negotiated, as set forth above, a call from PPP interface 132 (via TCP/IP 116 at port 520) is made to router 104 passing in some required information. Referring to FIG. 4, the information provided at port 520 is a packet 194 from configuration module 241 of data containing the following useful information.

1. The local interface name 182.
2. The negotiated local IP address 170.
3. The negotiated remote IP address 180.
4. The subnet mask 184.

Once RouteD 104 receives this information from PPP configuration code 241, the logical interface name/symbolic name 182 is looked up in configuration table 140. A route entry 271 is made in route table 138, along with configuration information 272, and is added to the list 138 of active interfaces 250, 252, 254. RouteD 104 will then execute the RIP protocols set forth in RFC's 1058 and 1723.

ADVANTAGES OVER THE PRIOR ART

It is an advantage of the invention that a constant value is provided for identifying a dynamic interface.

It is a further advantage of the invention than an improved system and method for configuring a dynamic interface is provided.

It is a further advantage the invention that constant values identifying the configurations of dynamic interfaces are provided.

It is a further advantage of the invention that the processing advantages of running a dynamic routing protocol over an interface with a changing IP are provided.

ALTERNATIVE EMBODIMENTS

It will be appreciated that, although specific embodiments of the invention have been described herein for purposes of illustration, various modifications may be made without departing from the spirit and scope of the invention. In particular, while the preferred embodiment has been described primarily in the context of its use in a RIP router, as will be apparent to those skilled in the art, it may be used in the context of other like routing protocols.

Clearly, any computing system capable of interfacing to a network may be configured to operate as a router operable in accordance with this invention, including but not limited to those which are configured according to the ISO networking model. Such systems include, for example, the IBM AS/400 system, and also the IBM System/390 computing system, and the IBM Personal Computer. Further, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. A method for configuring dynamic interfaces, comprising the steps of:

saving routing configuration information using symbolic names;

determining when a symbolically named interface becomes active;

resolving the symbolic name to an operational IP address for routing and creating dynamic routing protocol packets; and thereafter communicating said dynamic routine protocol packets over said dynamic interface.

2. A method for configuring dynamic interfaces for routing and creating dynamic routing protocol packets, comprising the steps of:

initializing a configuration table with entries for each of one or more active interfaces and associated interface configuration information;

initializing a route table with an entry for each active route;

responsive to a request to activate a dynamic interface, said request including a logical name:
  establishing a physical connection to said interface; and
  negotiating an IP address defining said interface;

generating a message packet including said logical name and said IP address;

responsive to said message packet, obtaining from said configuration table configuration information associated with a local interface name matching said logical name;

adding a route entry to said route table including information from said configuration table and said message packet associated with said IP address; and communicating routing protocol packets over the dynamic interface configured with said IP address and said configuration information.

3. The method of claim 2, said IP address comprising a remote IP address and a local IP address and said routing protocol packets being RIP packets.

4. The method of claim 3, said route entry including a destination network IP address, a gateway IP address, a time value, a metric, and learned interface IP address.

5. A system for configuring dynamic interfaces, comprising:

an interface configuration table for saving routing configuration information using symbolic names;

a routing table for storing the configuration information for at least one route identified by an operational IP address;

a configuration control module responsive to activation of a symbolically named interface for resolving the symbolic name to an operational IP address for said dynamic interface for routing and creating dynamic routing protocol packets;

said configuration control module updating said routing table with a route entry including said operational IP address for said dynamic interface; and a router module responsive to said route entry for communicating said dynamic routing protocol packets over said dynamic interface.

6. A memory device for storing signals for structuring the components of a digital computer to configure a dynamic interface, comprising:

first configuration signals for operating said digital computer to save routing configuration information using symbolic names;

second configuration signals for determining when a symbolically named interface becomes active;

third configuration signals for resolving the symbolic name to an operational IP address for routing and creating dynamic routing protocol packets; and thereafter third configuration signals for communicating said dynamic routing protocol packets over said dynamic interface.

* * * * *